(12) United States Patent
Spinelli et al.

(10) Patent No.: US 11,694,450 B1
(45) Date of Patent: Jul. 4, 2023

(54) COMPUTERIZED SYSTEMS AND METHODS FOR REAL-TIME COMMUNICATION ALERTS VIA CAMERAS, GATEWAY DEVICES AND ON-BODY TECHNOLOGY

(71) Applicant: RS1Worklete, LLC, Denver, CO (US)

(72) Inventors: Michael Patrick Spinelli, Croton, NY (US); SivaSankara Reddy Bommireddy, Secaucus, NJ (US)

(73) Assignee: RS1Worklete, LLC, Denver, CO (US)

(*) Notice: Subject to any disclaimer, the term of this patent is extended or adjusted under 35 U.S.C. 154(b) by 0 days.

(21) Appl. No.: 18/046,707

(22) Filed: Oct. 14, 2022

(51) Int. Cl.
| | |
|---|---|
| *G06V 40/10* | (2022.01) |
| *G08B 21/02* | (2006.01) |
| *G06V 20/60* | (2022.01) |
| *G06V 10/70* | (2022.01) |
| *G06T 7/50* | (2017.01) |
| *H04B 17/318* | (2015.01) |

(52) U.S. Cl.
CPC ............... *G08B 21/02* (2013.01); *G06T 7/50* (2017.01); *G06V 10/70* (2022.01); *G06V 20/60* (2022.01); *G06V 40/10* (2022.01); *G06T 2207/30196* (2013.01); *G06T 2207/30232* (2013.01); *H04B 17/318* (2015.01)

(58) Field of Classification Search
CPC ........ G08B 21/02; G06V 10/70; G06V 40/10; G06V 20/60; H04B 17/318; G06T 7/50; G06T 2207/30196; G06T 2207/30232
See application file for complete search history.

(56) References Cited

U.S. PATENT DOCUMENTS

| | | | |
|---|---|---|---|
| 10,594,034 B1 * | 3/2020 | Tran | H01Q 1/04 |
| 2017/0311574 A1 * | 11/2017 | Swan | G06V 40/20 |
| 2021/0374391 A1 * | 12/2021 | Jorasch | G06V 40/10 |

* cited by examiner

*Primary Examiner* — Shaghayegh Azima
(74) *Attorney, Agent, or Firm* — Neugeboren O'Dowd PC

(57) ABSTRACT

According to some embodiments, disclosed are systems and methods for a novel framework of real-time event alert detection and communication. The disclosed framework operates by analyzing live-feeds of captured video at location and determining whether events lend towards a dangerous activity, then automatically alerting the users involved as to potential and/or imminent harm awaiting their actions. Rather than alerting one user, or a manger, as in conventional systems, the disclosed technology may evidence a communication relay among devices at a location, devices of users involved, as well as devices (and devices of users) overseeing operations within which the dangerous activity is anticipated or detected. This may lead to improved safety at and/or around workplace environments, as well as improved operational efficiency, thereby leading to reduced costs, reduced overhead and a reduction in resource expenditure.

26 Claims, 7 Drawing Sheets

COMPUTERIZED SYSTEMS AND METHODS FOR REAL-TIME COMMUNICATION ALERTS VIA CAMERAS, GATEWAY DEVICES AND ON-BODY TECHNOLOGY

FIELD OF TECHNOLOGY

The present disclosure generally relates to computer-based systems configured for computing devices programmed to generate and automatically communicate alerts to devices of at a location based on the detection of real-time events via cameras, gateway devices and on-body technology.

BACKGROUND OF TECHNOLOGY

Modern workplaces, especially those involving manual labor, may involve dangerous environments. Not all dangerous activity is related to accidents, however, as a many tasks, whether they are manually performed or computer-aided, may involve the operation of machinery or the performance of a task in relation to a dangerous setting which may involve inherent risks, as well as harm to the welfare of the actor and those surrounding the actor.

SUMMARY

Accordingly, the disclosed systems and methods provide, among other features, a novel framework that provides a technical solution to alerting workers (e.g., referred to as users) as to dangerous conditions, settings and/or activities in real-time (or near real-time). As evident from the instant disclosure, the disclosed framework provides novel technological mechanisms for analyzing live-feeds of captured video and determining whether events lend towards a dangerous activity, then automatically alerting the users involved to the potential and/or projected imminent harm awaiting their actions. Rather than alerting one user, or a manger, as in conventional systems, the disclosed technology provides an automated communication relay among devices at a location, devices of users involved, as well as devices (and devices of users) overseeing operations within which the dangerous activity is anticipated or detected. This, among other technological benefits and improvements, leads to improved safety at and/or around workplace environments, as well as improved operational efficiency. Indeed, the disclosed technology may evidence reduced costs, reduced overhead and a reduction in resource expenditure, from both a personnel standpoint as well as from the computing devices operating therein/thereon. Moreover, the accuracy and efficiency, as well as reduced resource expenditure (e.g., via alerts provided directly to users) provided by the disclosed systems ensures that the proper alerts are being communicated to the proper users and devices, rather than the mechanical nature conventional systems require which adhere to a hierarchy, which may hinder the accident prevention the disclosed technology enables.

According to some embodiments of the instant disclosure, described herein is an illustrative system for real-time communication of event alerts to devices at a location. The system includes at least one edge device including at least one processor, where the at least one processor is in communication with a non-transitory computer readable medium having software instructions stored thereon, where, upon execution of the software instructions, the at least one processor is configured to: receive at least one image from at least one camera; where the at least one camera is associated with at least one location within an area; where the at least one image is of the at least one location within the area; utilize at least one object detection machine learning model to detect at least one object present in the at least one image; utilize at least one object recognition machine learning model to determine the at least one object to be: at least one hazardous event, and at least one person; identify at least one gateway device within the at least one image based at least in part on the at least one location; determine at least one hazardous event pixel distance between the at least one gateway device and the at least one hazardous event the at least one image; determine at least one hazardous event physical distance indicative of a distance between the at least one gateway device and the at least one hazardous event in the area based at least in part on a predetermined measurement table; where the predetermined measurement table includes a mapping indicative of pixel distance to physical distance; determine at least one person pixel distance between the at least one gateway device and the at least one person based at least in part on the at least one image; determine at least one person physical distance indicative of a distance between the at least one gateway device and the at least one person in the area based at least in part on the predetermined measurement table; generating, by the least one processor, at least one event alert to the at least one gateway; where the at least one event alert includes: at least one hazardous event indicator indicating the at least one hazardous event, the at least one hazardous event physical distance, and the at least one person physical distance; where the at least one event alert is configured to cause the at least one gateway to: communicate with at least one wireless communication module associated with at least one person to determine at least one person physical distance of the at least one person based at least in part on at least one wireless signal strength of the at least one wireless communication module; identify the at least one wireless communication module as associated with the at least one person based on the at least one person physical distance and the at least one person physical distance; and communicate the at least one event alert to the at least one wireless communication module of the at least one person.

According to some embodiments, described herein is an illustrative method for real-time communication of event alerts to devices at a location. According to some embodiments, a method is disclosed, which includes: receiving, by at least one processor of at least one edge device, at least one image from at least one camera; where the at least one camera is associated with at least one location within an area; where the at least one image is of the at least one location within the area; utilizing, by the at least one processor, at least one object detection machine learning model to detect at least one object present in the at least one image; utilizing, by the at least one processor, at least one object recognition machine learning model to determine: at least one hazardous event, and at least one person; identifying, by the at least one processor, at least one gateway device within the at least one image based at least in part on the at least one location; where the at least one gateway device includes at least one wireless communication radio configured to identify the at least one person by performing steps to: communicate with the at least one wireless communication module to determine at least one physical distance based at least in part on at least one wireless signal strength of the at least one wireless communication module; identify the at least one wireless communication module as associated with the at least one person based on the at least one physical distance; and communicate with the at least one wireless communication module of the at least one person; determining, by the at least one processor, within the at least one image, at least one hazardous event pixel distance between the at least one gateway device and the at least one hazardous event; determining, by the at least one processor, at least one hazardous event physical distance indicative of a distance between the at least one gateway device and the at least one hazardous event in the area based at least in part on a predetermined measurement table and the at least one hazardous event pixel distance; determining, by the at least one processor within the at least one image, at least one person pixel distance between the at least one gateway device and the at least one person; determining, by the at least one processor, at least one first person physical distance indicative of a distance between the at least one gateway device and the at least one person in the area based at least in part on the predetermined measurement table and the at least one person pixel distance, where the predetermined measurement table includes a mapping indicative of the at least one person pixel distance to a physical distance; generating, by the least one processor, at least one event alert to the at least one gateway; where the at least one event alert includes: at least one hazardous event indicator indicating the at least one hazardous event, the at least one hazardous event physical distance, and the at least one first person physical distance; where the at least one event alert is configured to cause the at least one gateway to identify the at least one person by performing steps to: communicate with at least one wireless communication module to determine at least one second person physical distance of the at least one person based at least in part on at least one wireless signal strength of the at least one wireless communication module; identify the at least one wireless communication module as associated with the at least one person based on the at least one second person physical distance and the at least one first person physical distance; and communicate the at least one event alert to the at least one wireless communication module of the at least one person.

According to some embodiments, the one or more systems and/or methods for real-time communication of event alerts to devices at a location further include: analyzing a set of images associated with the location, the set of images including content depicting areas within the location; identifying, based on the analysis, a known object, the known object corresponding to a real-world item at the location; and determining a pattern of identification of the known object within at least a portion of the set of images.

According to some embodiments, the one or more systems and/or methods for real-time communication of event alerts to devices at a location further include: calibrating, based on the pattern of identification, the predetermined measurement table, where the mapping of the at least one person pixel distance to a physical distance is based on the calibration.

According to some embodiments, the one or more systems and/or methods for real-time communication of event alerts to devices at a location further include, where the determination of the at least one first person physical distance is based on the calibrated predetermined measurement table.

According to some embodiments, the one or more systems and/or methods for real-time communication of event alerts to devices at a location further include, where the known object is the at least one gateway device.

According to some embodiments, the one or more systems and/or methods for real-time communication of event alerts to devices at a location further include, where the at least one hazardous event includes at least one of: at least one electrical hazard (e.g., a live wire, exposed electrical wire, for example), debris, at least one spill, and at least one fire.

According to some embodiments, the one or more systems and/or methods for real-time communication of event alerts to devices at a location further include, where the at least one wireless communication module includes at least one of Bluetooth radio.

According to some embodiments, the one or more systems and/or methods for real-time communication of event alerts to devices at a location further include, where the at least one wireless signal strengths includes a plurality of received signal strength indicators (RSSI).

According to some embodiments, the one or more systems and/or methods for real-time communication of event alerts to devices at a location further include, where the at least one event alert is configured to cause the at least one gateway to: communicate with the at least one wireless communication module associated with the at least one person; identify that the at least one wireless communication module is one wireless communication module; and communicate the at least one event alert to the one wireless communication module.

According to some embodiments, the one or more systems and/or methods for real-time communication of event alerts to devices at a location further include, where the at least one event alert is configured to cause the at least one gateway to: communicate with the at least one wireless communication module associated with the at least one person; identify that the at least one wireless communication module is a plurality of wireless communication modules; determine a plurality of user physical distances based at least in part on a plurality of wireless signal strengths of the plurality of wireless communication modules; identify at least one wireless communication module of the plurality of wireless communication modules associated with the at least one person based on the at least one person physical distance and the plurality of user physical distances; and communicate the at least one event alert to the at least one wireless communication module of the at least one person.

According to some embodiments, the one or more systems and/or methods for real-time communication of event alerts to devices at a location further include: determining, by the at least one processor, at least one person-to-hazard physical distance based at least in part on the at least one person physical distance and the at least one hazard physical distance.

According to some embodiments, the one or more systems and/or methods for real-time communication of event alerts to devices at a location further include, where the at least one wireless communication module includes at least one wearable device worn by the at least one person.

According to some embodiments, the one or more systems and/or methods for real-time communication of event alerts to devices at a location further include: identifying, by the at least one processor, a plurality of gateway devices within the at least one image based at least in part on the at least one location; determining, by the at least one processor, for each gateway device of the plurality of gateway devices, a pixel distance between each gateway device and the at least one person based at least in part on the at least one image; and identifying, by the at least one processor, the at least one gateway device based at least in part on a nearest proximity of the plurality of gateway devices to the at least one person.

According to some embodiments, the one or more systems and/or methods for real-time communication of event alerts to devices at a location further include, where the at least one edge device includes at least one of: the at least one camera, and the at least one gateway device.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
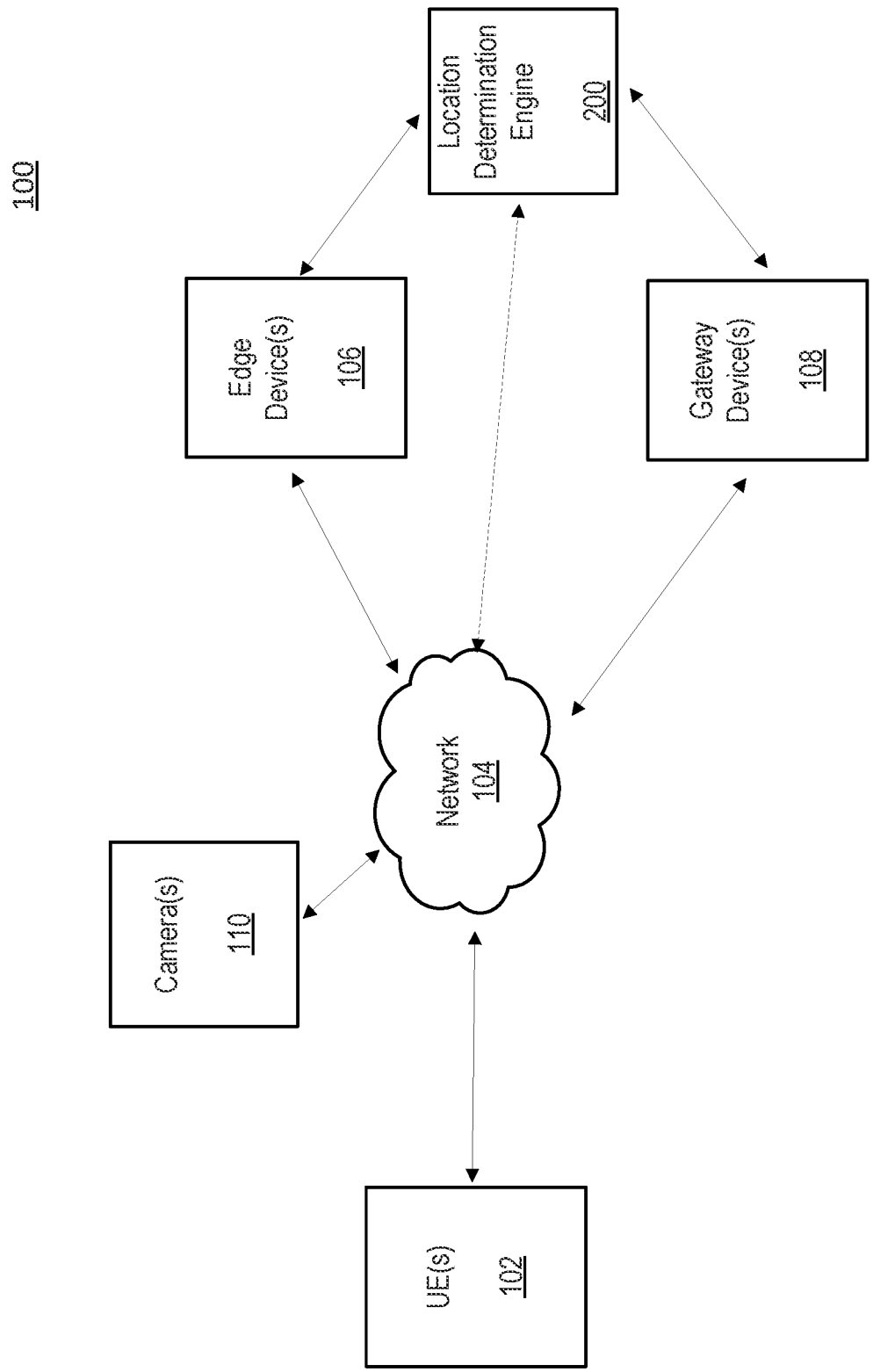
FIG. 1 is a block diagram of an example location/network configuration within which the systems and methods disclosed herein could be implemented according to some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

The present disclosure is described below with reference to block diagrams and operational illustrations of methods and devices. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

For the purposes of this disclosure the term "server" should be understood to refer to a service point which provides processing, database, and communication facilities. By way of example, and not limitation, the term "server" may refer to a single, physical processor with associated communications and data storage and database facilities, or it may refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device, referred to as user equipment (UE)), may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device (UE) may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles of the instant disclosure will now be described in greater detail. According to some embodiments, in connection with the subject matter disclosed and depicted in FIGS. 1-7, the disclosed systems and methods provide a novel framework for the generation and automatic communication of real-time event alerts. The disclosed framework operates by analyzing live-feeds of captured video at location and determining whether events lend towards a dangerous activity, then automatically alerting the users involved as to potential and/or imminent harm awaiting their actions.

According to some embodiments, as discussed herein in more detail, the disclosed framework may cause a communication relay among devices at a location, devices of users involved, as well as devices (and devices of users) overseeing operations within which the dangerous activity is anticipated or detected. For example, an alert may be sent to a device of a user performing an activity determined to correspond to dangerous activity, a device of a manager, a device of another user determined to be proximate to the user, a gateway device determined to be proximate to the user, and the like, or some combination thereof.

Based on such technical features, further technical benefits become available to users and operators of these systems and methods. Moreover, various practical applications of the disclosed technology are also described, which provide further practical benefits to users and operators that are also new and useful improvements in the art.

With reference to FIG. 1, depicted within location 100 is a UE 102 (e.g., a client device, as mentioned above), network 104, edge device 106, gateway 108, camera 110 and location determination engine 200. It should be understood that while only one UE 102, edge device 106, gateway 108 and camera 110 is depicted, this should not be construed as limiting, as one of ordinary skill would readily understand that multiple UEs, edge devices, gateways and cameras may be operating and positioned within (or around) a location.

According to some embodiments, location 100 may correspond to any type of geographic area or enclosure, such as, but not limited to, a warehouse, factory, arena, building, office, garage, healthcare facility, home, and the like. The location 100 may be defined by the confines of buildings located thereon, and/or the areas surrounding such buildings. For example, the outside of the building, including the sidewalks and parking lots.

A location 100 may include a set of cameras 110. According to some embodiments, a camera 110 may be set at different mounting points with different view angles within the location 100. Thus, each camera 110 may provide a different view of the location 100 for a different angle or perspective of each point on a surface, such as a floor, ground or other walking surface within the location 100 (e.g., on scaffolding, on a ladder, within a shaft, and the like, for example). In some embodiments, to improve the view of each camera 110, the location 100 may include one or more light sources, such as, e.g., ceiling lighting, drop lighting, lamps, among other light sources or any combination thereof.

In some embodiments, the different views of each camera 110 may be determined iteratively by automated and/or manual adjustment. In some embodiments, each camera 110 may be assigned to the particular location 100 and to particular area(s) within the location 100. Thus, each camera 110 may be adjusted to ensure that each camera 110 of the location 100 is directed to the particular area(s) to provide the different views. In some embodiments, the cameras 110 may be mounted on adjustable mounts to allow for manual or automated adjustment of each camera 110. In some embodiments, the adjustable mount or each camera 110 may include one or more ball joints, hinges, articulated members, tripods, wall plates, or other fixed or mobile mounting points with suitable attachment mechanisms.

In some embodiments, the adjustable mount of each camera 110 may include a motorized mount for automated adjustment of each camera 110. In some embodiments, each camera 110 in the location 100 may be interconnected to exchange data of the respective views of each camera 110. For example, in some embodiments, a first camera 110 may capture image data of the location 100 and automatically detect the area including, e.g., key points within the area (e.g., of landmarks and/or features of the area). In some embodiments, the first camera 110 may communicate data regarding the detected area and key points (e.g., a distance, an angle, etc. of the area with respect to the first camera 110) to a second camera 110. In some embodiments, the second camera 110 may automatically adjust its view to capture the same area in image data via detection of the key points and matching spatial locations to the key points in the image data of the first camera 110.

In some embodiments, interconnected cameras 110 in the location 100 may further make coordinated adjustments. In some embodiments, the first camera 110 may readjust orientation and/or zoom based on image data from the second camera 110, and vice versa. In some embodiments, the first and second cameras 110 may iteratively adjust orientation and/or zoom based on a two-way exchange of data to capture common areas and/or features of the location 100. In some embodiments, the fatigue detection system 110 may instruct the first and second cameras 110, as well as any other cameras 110 in the location 100 to adjust orientation and/or zoom based on the image communicated amongst the cameras 110.

In some embodiments, each camera 110 may capture and provide image data, such as, e.g., image frames, periodic images, a continuous video feed, periodic video segments, or other form of image data. In some embodiments, the periodic images may be received on a periodic basis at predetermined intervals, such as, e.g., every 5 seconds, every 10 seconds, every 15 seconds, every 20 seconds, every 25 seconds, every 30 seconds, every 45 seconds, every minute, every 2 minutes, every 5 minutes, every 10 minutes, or other suitable interval. Similarly, the periodic video segments may include a video segment on a periodic basis at predetermined intervals, such as, e.g., every 5 seconds, every 10 seconds, every 15 seconds, every 20 seconds, every 25 seconds, every 30 seconds, every 45 seconds, every minute, every 2 minutes, every 5 minutes, every 10 minutes, or other suitable interval. Accordingly, in some embodiments, each camera 110 may include, e.g., a digital camera, image sensor, charge-coupled device (CCD), video camera, or other suitable image capturing device.

In some embodiments, the cameras 110 may include or be in connection with one or more sensors, which enables the automatic illumination (and de-illumination) of an area should light intensity values need to be increased (or decreased). For example, camera 110 may automatically scale a brightness of an associated light source in response to a light intensity detected by an associated light sensor.

In some embodiments, instead of or in addition to the light sensor, light intensity in the location 100 may be determined based on captured image data from one or more cameras 110 of the cameras 110 in the location 100. In some embodiments, for example, a pixel intensity of one or more pixels may be determined based on pixel values of a captured image. In some embodiments, the light intensity of the location 100 may be determined based on, e.g., an average pixel intensity across all pixels in a given image, a summed pixel intensity across all pixels in a given image, a peak pixel intensity across all pixels in a given image, a sample average pixel intensity across a sample of pixels in a given image, a sample sum pixel intensity across a sample of pixels in a given image, a peak sample average pixel intensity of a highest average pixel intensity between all samples of pixels in a given image, a peak sample sum pixel intensity of a highest sum of pixel intensity between all samples of pixels in a given image, or any other suitable methodology for determine light intensity in the location 100 based on pixel values of each image captured.

In some embodiments, cameras 110 may include any other suitable sensor device for adjusting the operation of the cameras 110, such as, e.g., a motion detection sensor. Accordingly, in some embodiments, a motion detection sensor may be employed to trigger activation of the cameras upon detection of motion.

In some embodiments, the image data captured by the cameras 110 may be communicated to location determination engine 200 (and therefore, edge device 106, gateway 108 and/or UE 102) directly (via wireless and/or wired connection(s) and/or networks) and/or network 104. In at least some embodiments, network 104 may be any type of network, such as, but not limited to, a wireless network, cellular network, the Internet, and the like (as discussed above). Network 104 facilitates connectivity of the components associated with location 100, as illustrated in FIG. 1.

Further examples and discussion of network 104 are provided below with reference to FIGS. 4-7.

UE 102 may be any type of device, such as, but not limited to, a mobile phone, tablet, laptop, sensor, Internet of Things (IoT) device, wearable device, autonomous machine, and any other device equipped with a cellular or wireless or wired transceiver.

According to some embodiments, edge device 106 is a device, or piece of hardware, that controls data flow over network 104. For example, edge device 106 may be, but is not limited to, an edge router, switch, firewall, multiplexer, server, actuator, IoT gateway, and the like. In some embodiments, edge device 106 may be configured to process image data from camera 110 and enable an alert to be communicated to UE 102 and/or gateway 108. According to some embodiments, edge device 106 may be configured as, and/or provided functionality for capturing image data—for example, camera 110 may operate as an edge device.

Accordingly, in some embodiments, edge device 106 receives image data from camera 110. As discussed below, edge device 106 may host and/or execute functionality related to location determination engine 200. Edge device 106 may be associated with and/or in communication with a database (not shown), which may store image data and/or event alerts determined from the analyzed image data, as discussed below. In some embodiments, such database may be any type of data store, including, but not limited to, a look-up table (LUT), a distributed ledger system (e.g., blockchain), and the like.

In some embodiments, a blockchain may include one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a digital chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that may be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that may be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

According to some embodiments, edge device 106 and gateway 108 may be positioned at and/or around location 100 in a similar manner as camera 110, as discussed above. Indeed, gateways 108 may be utilized to determiner exact positioning of UEs 102 from the image data, as discussed below in more detail.

According to some embodiments, gateway (or gateway device) 108 is configured as an entry and/or exit point of network 104 in association with edge device 106. Gateway 108 may operate by connecting with edge device 106 via network 104, whereby gateway may receive events and other information from edge device 106 in relation to UE 102. For example, gateway 108 may receive an alert that a user of UE 102 is performing a dangerous task, and be caused, by edge device 106 to output an alert (e.g., sound, haptic, and the like) thereby alerting the user and other users as to the dangerous situation.

Location determination engine 200, as discussed above and below in more detail, may include components for determining event alerts, and causing their communication at the location 100.

By way of a non-limiting example, according to some embodiments, engine 200, operating on edge device 106, for example, may receive image data from camera 110 of a user's movements within location 100, where the user is associated with UE 102. Engine 200 may process the movements and determine a risky activity that the user is performing, as discussed below in relation to at least FIG. 3. Such processing may involve, but is not limited to, identity of the user, detection of the movements, identification of the type of movements, identification of the risk, location of the movements, location of the movements respective to a detected gateway captured in the image frames of the image data, and the like, or some combination thereof. Engine 200, therefore, may determine a location of the user's movement that correspond to the risky event. As a result, engine 200 may cause an alert to be sent to the UE 102 of the user, as well as an alert to the gateway device 108 captured in the image data/frame.

According to some embodiments, location determination engine 200 may be a special purpose machine or processor and could be hosted by a device on network 104, within edge device 106, gateway 108 and/or on UE 102. In some embodiments, engine 200 may be hosted by a server and/or set of servers associated with a cloud system operating at location 100.

According to some embodiments, as discussed above, location determination engine 200 may function as an application. In some embodiments, engine 200 may function as an application installed on a server(s), network location and/or other type of network resource associated with location 100. In some embodiments, engine 200 may function as application installed and/or executing on edge device 106, gateway 108 and/or UE 102. In some embodiments, such application may be a web-based application accessed by edge device 106, gateway 108 and/or UE 102 over network 104 from a cloud system. In some embodiments, engine 200 may be configured and/or installed as an augmenting script, program or application (e.g., a plug-in or extension) to another application or program provided by a cloud system and/or executing on edge device 106, gateway 108 and/or UE 102.

In some embodiments, location determination engine 200 may be configured to one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

a. define Neural Network architecture/model,
b. transfer the input data to the exemplary neural network model,
c. train the exemplary model incrementally,
d. determine the accuracy for a specific number of timesteps,
e. apply the exemplary trained model to process the newly-received input data,
f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

Figure 2:
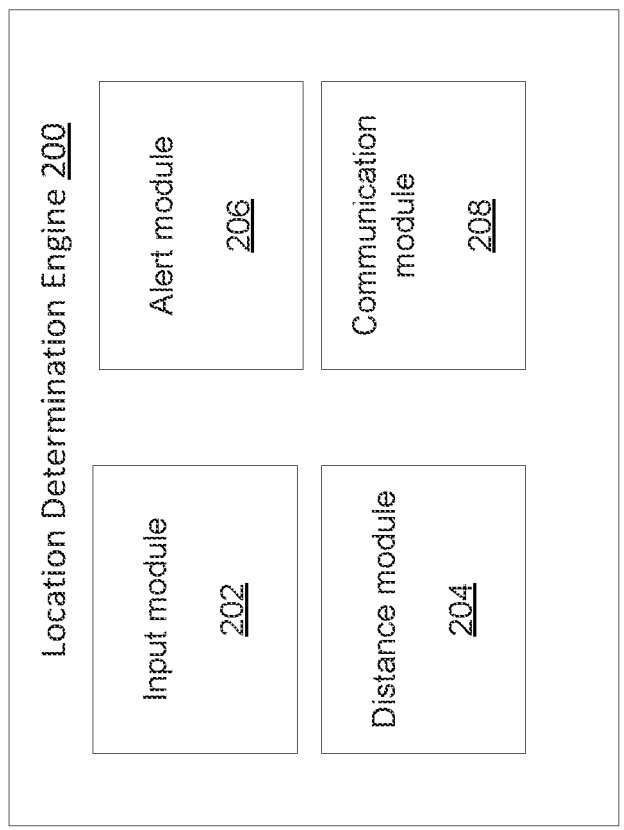
FIG. 2 is a block diagram illustrating components of an exemplary system according to some embodiments of the present disclosure.

As illustrated in FIG. 2, according to some embodiments, location determination engine 200 includes input module 202, distance module 204, alert module 206 and communication module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below in relation to FIG. 3, inter alia.

Figure 3:
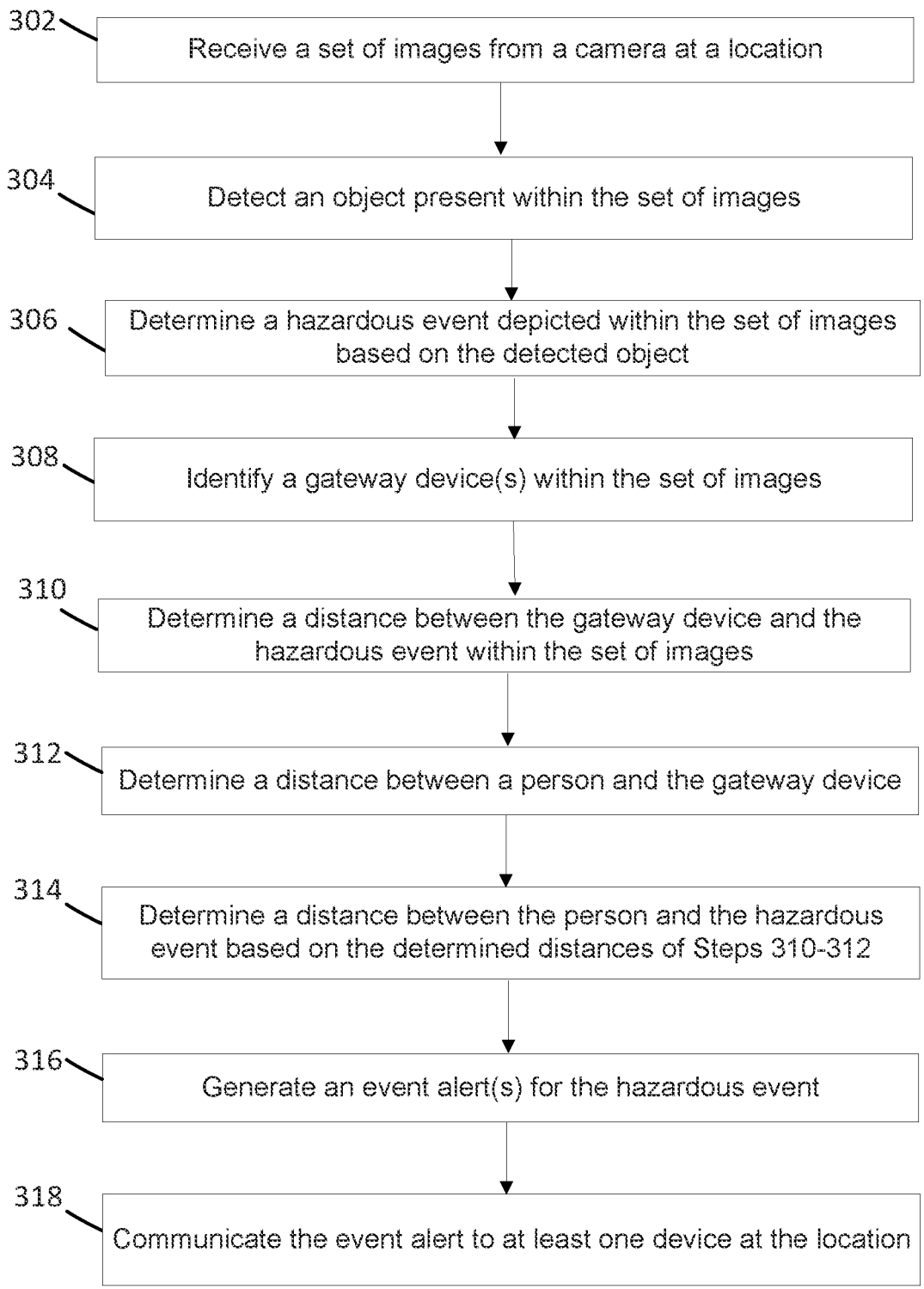
FIG. 3 illustrates an exemplary work flow according to some embodiments of the present disclosure.

Turning to FIG. 3, Process 300 is provided which discloses non-limiting example embodiments for analyzing live-feeds of captured video at location and determining whether events lend towards a dangerous activity, then automatically alerting the users (and/or devices associated with the location) involved as to potential and/or imminent harm awaiting their actions.

According to some embodiments, Steps 302-308 of Process 300 may be performed by input module 202 of the location determination engine 200; Steps 310-314 may be performed by distance module 204; Step 316 may be performed by alert module 206; and Step 318 may be performed by communication module 208.

By way of a non-limiting example, according to some embodiments, when an edge device(s) at a location detects an event (e.g., a user performing a risky behavior), the edge device may identify and locate the gateway device that is in a zone of the camera that fed the video stream to the edge device using a database, which may include data associated with a set of identifying information about the gateways at a location. For example, such information may include, but is not limited to, an identifier (ID) of a gateway, location, position, communication range, communication capabilities, and the like. Once the gateway device is identified, the edge device may push a notification about the event and also the distance between the gateway device and the risky behavior to the gateway device. The gateway device may then detect the workers close by using a Bluetooth module associated with the gateway device.

According to some embodiments, if the uniquely identified worker is determined to be within a predetermined range of the gateway device, then an alert may be sent out to a device of that worker. In some embodiments, if there is only worker in the range of the gateway device, then an alert may be sent out to the worker for reception by a wearable device associated with the worker. In some embodiments, for example, if the event corresponds to a slip, trip or fall event, then a message may be sent out by the gateway to a manger of the worker, whereby the manager may be identified via identification from a searchable database.

In some embodiments, if there are multiple workers in the predetermined range of the gateway device, then the gateway device may estimate the distance between itself and each worker using Bluetooth RSSI, and may match such calculated distance with a distance measure received from the edge device to identify the right worker to issue an alert. In some embodiments, the edge device may be, or may be associated with, at least one camera, and/or at least one gateway device.

In some embodiments, if the event corresponds to a global risk event (e.g., a fire, spill in an aisle, debris in an aisle, and the like), the alert may be sent to all the workers in the range of the gateway device. In some embodiments, for a global event, an event alert may be sent to all gateway devices and/or wearable devices at or associated with the location.

According to some embodiments, Process 300 may begin with Step 302 where a set of images are received by engine 200 from a camera(s) at a location. In some embodiments, the set may include at least one image. In some embodiments, the images may correspond to an area of the location with which the camera is associated with and is capable of capturing images in relation to. According to some embodiments, as discussed above, the sequence (or set) of images may correspond to captured images or video (e.g., image frames) of the user's movements at/around a location. Thus, the images may capture a sequence of potions in a movement performed by a user (e.g., picking up a box, walking from an initial position to a destination, operating a piece of machinery, and the like). According to some embodiments, as discussed above, Step 302 may be based on detection by engine 200 and/or an associated camera (e.g., 110) that detects the user within a captured image frame and begins recording the user's movements based on such detected motion.

In Step 304, engine 200 may detect an object present within the set of images. In some embodiments, Step 304 may involve engine 200 analyzing the set of images via any type of known or to be known machine learning and/or artificial intelligence classifier or object detection machine learning model including, but not limited to, computer vision, recurrent neural networks, random forest models, logistic regression models, classifiers, support vector machines, hidden Markov models, Bayesian networks and the like. Accordingly, as mentioned above, the classifier or objection detection machine learning model implemented by engine 200 may be a trained model, whereby such training involve analyzing a set of training images comprising content depicting known objects at locations, people and/or hazardous events, which enables engine 200 to identify and detect such objects from images during execution, as discussed herein.

In Step 306, engine 200 may determine a hazardous event depicted within the set of images based on the detected object. According to some embodiments, Step 306 may involve engine 200 leveraging the object detection machine learning model to determine a hazardous event(s) and a person(s) from the set of images. For example, if the object is detected is a person, and the person is seen walking towards a puddle of oil in an aisle, then Step 306 may determine the hazardous event based therefrom. In some embodiments, as discussed herein, a hazardous event may involve, but is not limited to, at least one electrical hazard, debris, at least one spill, and at least one fire, and the like, or some combination thereof.

In Step 308, engine 200 may identify a gateway device(s) within the set of images. As discussed above, the gateway device may be situated strategically around the location. Thus, Step 308 may involve leveraging the object detection machine learning model to detect the location of the gateway device from the set of images.

According to some embodiments, as discussed above, the gateway device may include at least one wireless communication radio configured to identify a person (e.g., the person from Step 306). Such identification may be performed by the gateway device communicating with the at least one wireless communication module (e.g., a wearable device(s) worn by the person(s), and may be configured with Bluetooth™ radio) to determine a physical distance(s) based at least in part on wireless signal strength (e.g., a plurality of received signal strength indicators (RSSI)) of the at least one wireless communication module(s), then identifying the at least one wireless communication module as associated with the at least one person based on the at least one physical distance. The gateway device may then communicate with the at least one wireless communication module of the at least one person.

According to some embodiments, engine 200 may detect a plurality of gateway devices (e.g., a plurality of gateway devices captured within the set of images). Accordingly, in some embodiments, engine 200 may identify a plurality of gateway devices within the at least one image, then determine, for each gateway device of the plurality of gateway devices, a pixel distance between each gateway device and the person based at least in part on the at least one image. Engine 200 may then identify the at least one gateway device (from Step 308) based at least in part on a determined nearest proximity of the plurality of gateway devices to the at least one person.

In Step 310, engine 200 may determine, within the set of images, a hazardous event pixel distance(s) between the gateway device(s) and the hazardous event(s). Such pixel distance may be performed by engine 200 analyzing a distance in pixels between the gateway device and the hazardous event as depicted within the content of the set of images.

In Step 312, engine 200 may determine a distance between the person and the gateway device. That is, engine 200 may determine a hazardous event physical distance(s) indicative of a distance between the gateway device(s) and the hazardous event(s) in the area of the location based at least in part on a predetermined measurement table and the hazardous event pixel distance(s). Thus, for example, location information derived from the set of images related to the gateway device and the hazardous event, and the distances between such locations, may be used as input to a predetermined measurement table, whereby such distances may be translated into a hazardous event physical distance. In some embodiments, such translation may correspond to a pixel distance being adjusted according to a known scale so as to produce a physical distance equitable to the depicted distance in the image(s).

In Step 314, engine 200 may determine a distance between the person and the hazardous event based on the distances from Steps 310-312. That is, in some embodiments, engine 200 may determine a person pixel distance(s) between the gateway device(s) and the person. In some embodiments, such person pixel distance may involve combining the translated distance from Step 312 with the pixel distance from Step 310.

Accordingly, in some embodiments, Step 314 may involve engine 200 determining the first person physical distance indicative of a distance between the gateway device and the person in the area based at least in part on the predetermined measurement table and the person pixel distance. As discussed above, the predetermined measurement table involves a mapping indicative of the person pixel distance to a physical distance.

In some embodiments, Step 314 may alternatively or additionally involve engine 200 determining a person-to-hazard physical distance(s) based at least in part on the person physical distance(s) and the hazard physical distance(s). This distance may be used for generating an alert, as discussed below.

In Step 316, engine 200 may generate an event alert(s) to the gateway device(s). In some embodiments, the event alert may include information related to, but not limited to, a hazardous event indicator(s) indicating the hazardous event(s), the hazardous event physical distance(s), and the first person physical distance(s). In some embodiments, the event alert(s) may be configured to cause the gateway device(s) to identify the at least one person, which may be performed in a similar manner as discussed above in relation to at least Step 308.

Thus, in Step 318, engine 200 may communicate the event alert to at least one device at the location. For example, engine 200 may communicate the event alert to the gateway device, which will then relay a similar or same message to a device of the person/user. In some embodiments, as discussed above, gateway device may relay an alert to a manger of the person or user.

According to some embodiments, the communicated event alert, which is received by the gateway device(s), may cause the gateway device to communicate with the at least one wireless communication module associated with the at least one person, then identify that the at least one wireless communication module is one wireless communication module. In some embodiments, the gateway device may then communicate the at least one event alert to the one wireless communication module.

According to some embodiments, the communicated event alert, which is received by the gateway device(s), may cause the gateway device to communicate with the at least one wireless communication module associated with the at least one person, then identify that the at least one wireless communication module is a plurality of wireless communication modules. The gateway device may then determine a plurality of user physical distances based at least in part on a plurality of wireless signal strengths of the plurality of wireless communication modules, and identify at least one wireless communication module of the plurality of wireless communication modules associated with the at least one person based on the at least one person physical distance and the plurality of user physical distances. As a result, the gateway device may then communicate the at least one event alert to the at least one wireless communication module of the at least one person.

In some embodiments, the detected object from Step 304 may be a known object corresponding to real-world item at the location. For example, the known object may be a gateway device(s). As such, in some embodiments, engine 200 may determine a pattern of identification of the known object within at least a portion of set of images, which may be utilized to calibrate the predetermined measurement table.

Figure 4:
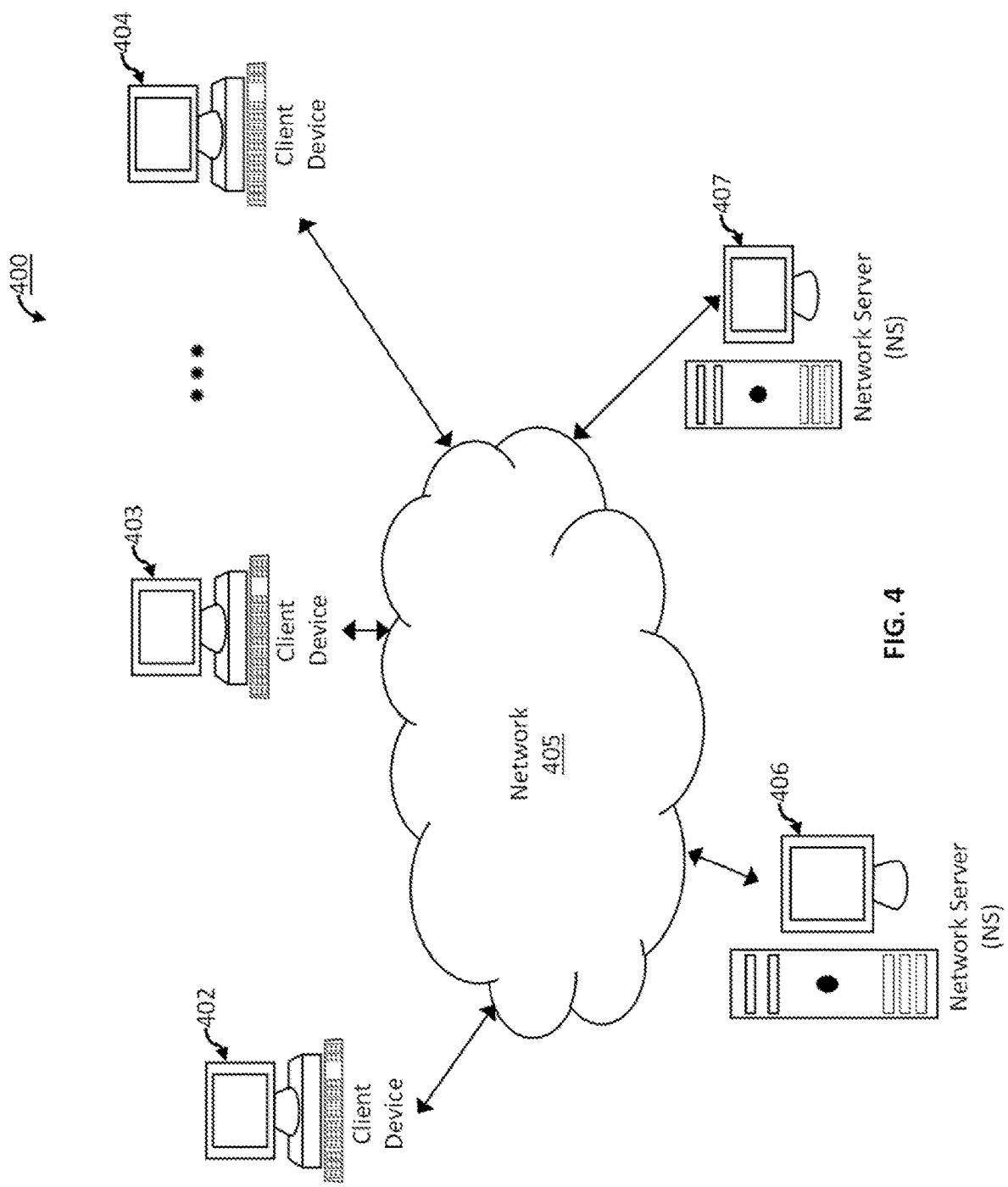
FIG. 4 is a block diagram depicting an exemplary computer-based system according to some embodiments of the present disclosure.

FIG. 4 depicts a block diagram of an exemplary computer-based system and platform 400 via a workflow service (and/or microservice) of a blockchain environment in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, member computing device 402, member computing device 403 through member computing device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, and the like). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++, Python, PHP and/or other suitable programming language. In some embodiment of the device software, device control may be distributed between multiple standalone applications. In some embodiments, software components/applications may be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 402-404 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Apache on Linux or Microsoft IIS (Internet Information Services). In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, and the like. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 5:
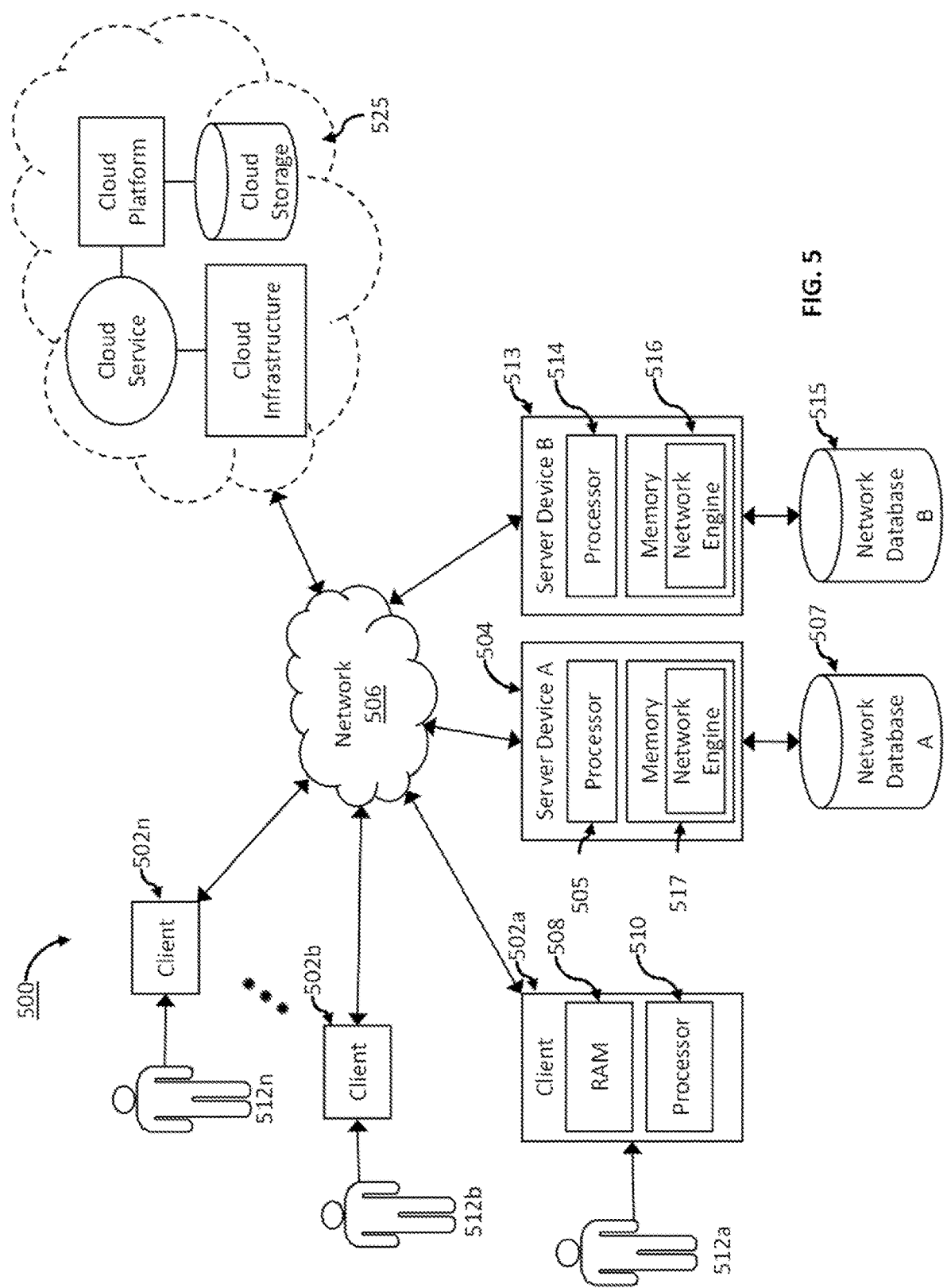
FIG. 5 depicts a block diagram of another exemplary computer-based system and platform according to some embodiments of the present disclosure.

FIG. 5 depicts a block diagram of another exemplary computer-based system and platform 500 via a workflow service (and/or microservice) of a blockchain environment in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 502a, member computing device 502b through member computing device 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor may read instructions. Also, various other forms of computer-readable media may transmit or carry instructions to a computer, including a router, private or public network, or other transmission device or channel, both wired and wireless. In some embodiments, the instructions may include code from any computer-programming language, including, for example, C, C++, Visual Basic, Java, Python, Perl, JavaScript, and the like.

In some embodiments, member computing devices 502a through 502n may also include a number of external or internal devices such as a mouse, a CD-ROM, DVD, a physical or virtual keyboard, a display, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, user 512a, user 512b through user 512n, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
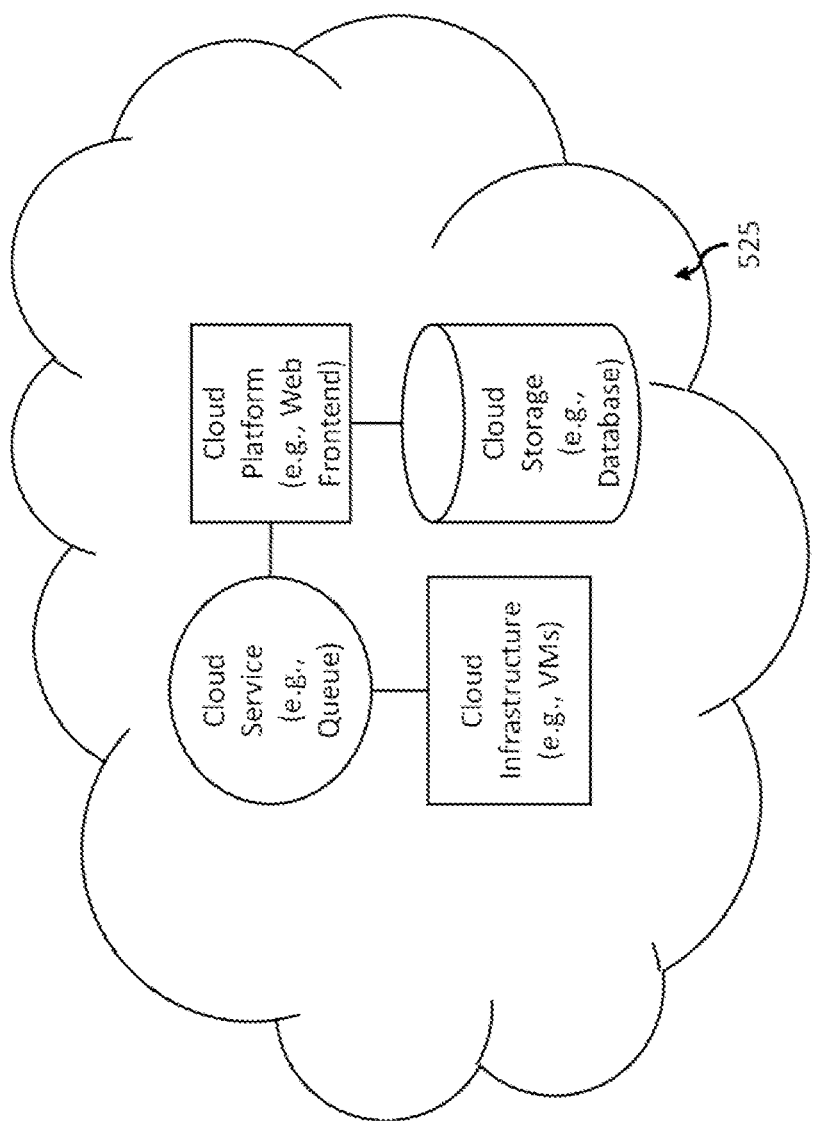
FIG. 6 depicts illustrative schematics of an exemplary implementation of the cloud computing/architecture(s) according to some embodiments of the present disclosure.
Figure 7:
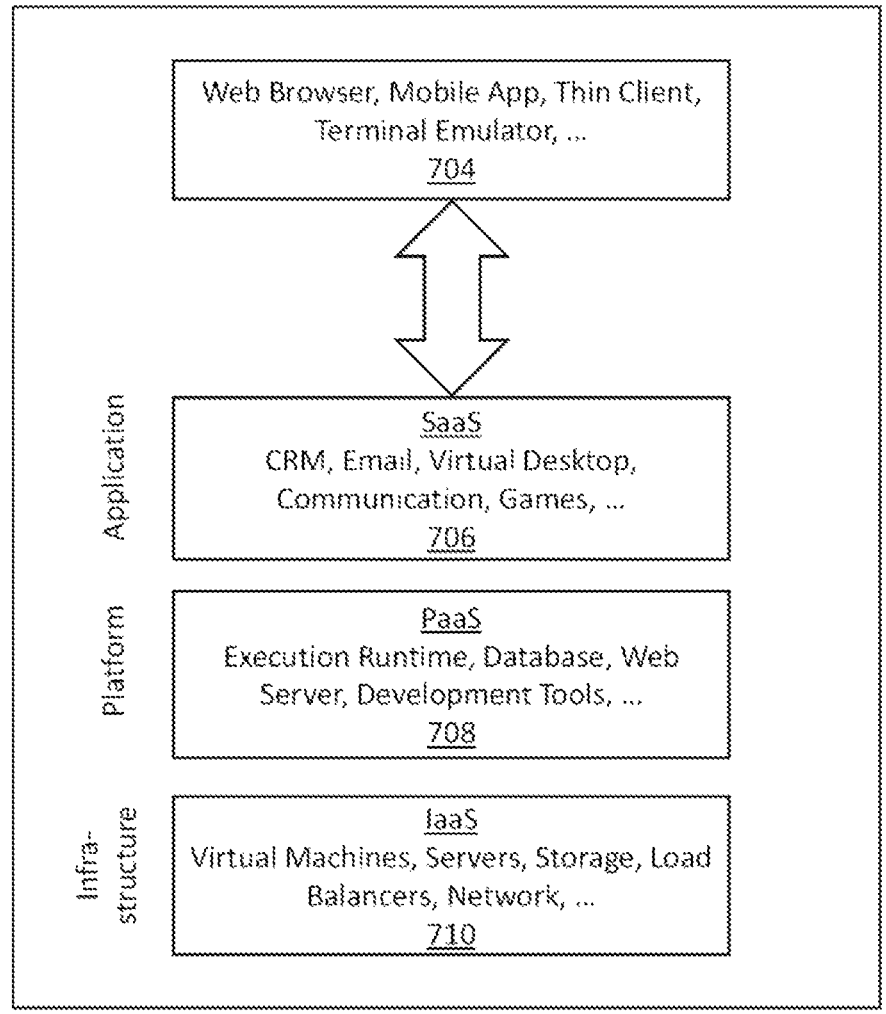
FIG. 7 depicts illustrative schematics of another exemplary implementation of the cloud computing/architecture(s) according to some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems for administrative customizations and control of network-hosted and/or blockchain-related APIs via a workflow service (and/or microservice) of a blockchain environment of the present disclosure may be specifically configured to operate.

It is understood that at least one aspect/functionality of various embodiments described herein may be performed in real-time and/or dynamically. As used herein, the term "real-time" is directed to an event/action that may occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation may be used in guiding the physical process.

As used herein, the term "dynamically" and term "automatically," and their logical and/or linguistic relatives and/or derivatives, mean that certain events and/or actions may be triggered and/or occur without any human intervention. In some embodiments, events and/or actions in accordance with the present disclosure may be in real-time and/or based on a predetermined periodicity of at least one of: nanosecond, several nanoseconds, millisecond, several milliseconds, second, several seconds, minute, several minutes, hourly, several hours, daily, several days, weekly, monthly, and the like.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, and the like), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that may be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., and the like). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

As used herein, the term "mobile device," or the like, may refer to any portable electronic device that may or may not be enabled with location tracking functionality (e.g., MAC address, Internet Protocol (IP) address, or the like). For example, a mobile electronic device may include, but is not limited to, a mobile phone, Personal Digital Assistant (PDA), Blackberry™, Pager, Smartphone, or any other reasonable mobile electronic device.

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH),WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" may refer to a person who receives data provided by the data or service provider over the Internet in a browser session or may refer to an automated software application which receives the data and stores or processes the data.

The aforementioned examples are, of course, illustrative, and not restrictive.

At least some aspects of the present disclosure will now be described with reference to the following numbered clauses.

1. A system including:
  at least one edge device including at least one processor, wherein the at least one processor is in communication with a non-transitory computer readable medium having software instructions stored thereon, wherein, upon execution of the software instructions, the at least one processor is configured to:
    receive at least one image from at least one camera;
      wherein the at least one camera is associated with at least one location within an area;
      wherein the at least one image is of the at least one location within the area;
    utilize at least one object detection machine learning model to detect at least one object present in the at least one image;
    utilize at least one object recognition machine learning model to determine the at least one object to be:
      at least one hazardous event, and
      at least one person;
    identify at least one gateway device within the at least one image based at least in part on the at least one location;
    determine at least one hazardous event pixel distance between the at least one gateway device and the at least one hazardous event the at least one image;
    determine at least one hazardous event physical distance indicative of a distance between the at least one gateway device and the at least one hazardous event in the area based at least in part on a predetermined measurement table;
      wherein the predetermined measurement table includes a mapping indicative of pixel distance to physical distance;
    determine at least one person pixel distance between the at least one gateway device and the at least one person based at least in part on the at least one image;
    determine at least one person physical distance indicative of a distance between the at least one gateway device and the at least one person in the area based at least in part on the predetermined measurement table;
    generating, by the least one processor, at least one event alert to the at least one gateway device;
      wherein the at least one event alert includes:
        at least one hazardous event indicator indicating the at least one hazardous event,
        the at least one hazardous event physical distance, and
        the at least one person physical distance;
      wherein the at least one event alert is configured to cause the at least one gateway device to:
        communicate with at least one wireless communication module associated with at least one person to determine at least one person physical distance of the at least one person based at least in part on at least one wireless signal strength of the at least one wireless communication module;
        identify the at least one wireless communication module as associated with the at least one person based on the at least one person physical distance and the at least one person physical distance; and communicate the at least one event alert to the at least one wireless communication module of the at least one person.

2. The system of clause 1, wherein, upon execution of the software instructions, the at least one processor is further configured to:

analyze a set of images associated with the location, the set of images including content depicting areas within the location;

identify, based on the analysis, a known object, the known object corresponding to a real-world item at the location;

determine a pattern of identification of the known object within at least a portion of the set of images.

calibrate, based on the pattern of identification, the predetermined measurement table, wherein the mapping of the at least one person pixel distance to a physical distance is based on the calibration.

3. The system of clause 2, wherein the determination of the at least one person physical distance is based on the calibrated predetermined measurement table.

4. The system of claim 1, wherein the at least one hazardous event includes at least one of:
at least one electrical hazard, debris,
at least one spill, and
at least one fire.

5. The system of clause 1, wherein the at least one wireless communication module includes a plurality of Bluetooth radios.

6. The system of clause 1, wherein the at least one wireless signal strengths includes a plurality of received signal strength indicators (RSSI).

7. The system of clause 1, wherein the at least one event alert is configured to cause the at least one gateway device to:

communicate with the at least one wireless communication module associated with the at least one person;
identify that the at least one wireless communication module is one wireless communication module; and
communicate the at least one event alert to the one wireless communication module.

8. The system of clause 1, wherein the at least one event alert is configured to cause the at least one gateway device to:

communicate with the at least one wireless communication module associated with the at least one person;
identify that the at least one wireless communication module is a plurality of wireless communication modules;
determine a plurality of user physical distances based at least in part on a plurality of wireless signal strengths of the plurality of wireless communication modules;
identify at least one wireless communication module of the plurality of wireless communication modules associated with the at least one person based on the at least one person physical distance and the plurality of user physical distances; and
communicate the at least one event alert to the at least one wireless communication module of the at least one person.

9. The system of clause 1, wherein, upon execution of the software instructions, the at least one processor is further configured to:

determine at least one person-to-hazard physical distance based at least in part on the at least one person physical distance and the at least one hazard physical distance.

10. The system of clause 1, wherein the at least one wireless communication module includes at least one wearable device worn by the at least one person.

11. The system of clause 1, wherein, upon execution of the software instructions, the at least one processor is further configured to:

identify a plurality of gateway devices within the at least one image based at least in part on the at least one location;

determine for each gateway device of the plurality of gateway devices, a pixel distance between each gateway device and the at least one person based at least in part on the at least one image; and identify the at least one gateway device based at least in part on a nearest proximity of the plurality of gateway devices to the at least one person.

12. The system of clause 11, wherein the at least one edge device includes at least one of:
the at least one camera, and
the at least one gateway device.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein may be utilized in any combination with each other. Further still, the various steps may be carried out in any desired order (and any desired steps may be added and/or any desired steps may be eliminated).

What is claimed is:

1. A method comprising:
receiving, by at least one processor of at least one edge device, at least one image from at least one camera;
wherein the at least one camera is associated with at least one location within an area;
wherein the at least one image is of the at least one location within the area;
utilizing, by the at least one processor, at least one object detection machine learning model to detect at least one object present in the at least one image;
utilizing, by the at least one processor, at least one object recognition machine learning model to determine:
at least one hazardous event, and
at least one person;
identifying, by the at least one processor, at least one gateway device within the at least one image based at least in part on the at least one location;
wherein the at least one gateway device comprises at least one wireless communication radio configured to identify the at least one person by performing steps to:
communicate with the at least one wireless communication module to determine at least one physical distance based at least in part on at least one wireless signal strength of the at least one wireless communication module;
identify the at least one wireless communication module as associated with the at least one person based on the at least one physical distance; and communicate with the at least one wireless communication module of the at least one person;
determining, by the at least one processor, within the at least one image, at least one hazardous event pixel distance between the at least one gateway device and the at least one hazardous event;
determining, by the at least one processor, at least one hazardous event physical distance indicative of a distance between the at least one gateway device and the at least one hazardous event in the area based at least in part on a predetermined measurement table and the at least one hazardous event pixel distance;
determining, by the at least one processor within the at least one image, at least one person pixel distance between the at least one gateway device and the at least one person;
determining, by the at least one processor, at least one first person physical distance indicative of a distance between the at least one gateway device and the at least one person in the area based at least in part on the predetermined measurement table and the at least one person pixel distance, wherein the predetermined measurement table comprises a mapping indicative of the at least one person pixel distance to a physical distance;
generating, by the least one processor, at least one event alert to the at least one gateway device;
wherein the at least one event alert comprises:
at least one hazardous event indicator indicating the at least one hazardous event,
the at least one hazardous event physical distance, and
the at least one first person physical distance;
wherein the at least one event alert is configured to cause the at least one gateway device to identify the at least one person by performing steps to:
communicate with at least one wireless communication module to determine at least one second person physical distance of the at least one person based at least in part on at least one wireless signal strength of the at least one wireless communication module;
identify the at least one wireless communication module as associated with the at least one person based on the at least one second person physical distance and the at least one first person physical distance; and
communicate the at least one event alert to the at least one wireless communication module of the at least one person.

2. The method of claim 1, further comprising:
analyzing a set of images associated with the location, the set of images comprising content depicting areas within the location;
identifying, based on the analysis, a known object, the known object corresponding to a real-world item at the location; and
determining a pattern of identification of the known object within at least a portion of the set of images.

3. The method of claim 2, further comprising:
calibrating, based on the pattern of identification, the predetermined measurement table, wherein the mapping of the at least one person pixel distance to a physical distance is based on the calibration.

4. The method of claim 3, wherein the determination of the at least one first person physical distance is based on the calibrated predetermined measurement table.

5. The method of claim 2, wherein the known object is the at least one gateway device.

6. The method of claim 1, wherein the at least one hazardous event comprises at least one of:
at least one electrical hazard,
debris,
at least one spill, and
at least one fire.

7. The method of claim 1, wherein the at least one wireless communication module comprises at least one of Bluetooth radio.

8. The method of claim 1, wherein the at least one wireless signal strengths comprises a plurality of received signal strength indicators (RSSI).

9. The method of claim 1, wherein the at least one event alert is configured to cause the at least one gateway device to:
communicate with the at least one wireless communication module associated with the at least one person;
identify that the at least one wireless communication module is one wireless communication module; and
communicate the at least one event alert to the one wireless communication module.

10. The method of claim 1, wherein the at least one event alert is configured to cause the at least one gateway device to:
communicate with the at least one wireless communication module associated with the at least one person;
identify that the at least one wireless communication module is a plurality of wireless communication modules;
determine a plurality of user physical distances based at least in part on a plurality of wireless signal strengths of the plurality of wireless communication modules;
identify at least one wireless communication module of the plurality of wireless communication modules associated with the at least one person based on the at least one person physical distance and the plurality of user physical distances; and
communicate the at least one event alert to the at least one wireless communication module of the at least one person.

11. The method of claim 1, further comprising:
determining, by the at least one processor, at least one person-to-hazard physical distance based at least in part on the at least one person physical distance and the at least one hazard physical distance.

12. The method of claim 1, wherein the at least one wireless communication module comprises at least one wearable device worn by the at least one person.

13. The method of claim 1, further comprising:
identifying, by the at least one processor, a plurality of gateway devices within the at least one image based at least in part on the at least one location;
determining, by the at least one processor, for each gateway device of the plurality of gateway devices, a pixel distance between each gateway device and the at least one person based at least in part on the at least one image; and
identifying, by the at least one processor, the at least one gateway device based at least in part on a nearest proximity of the plurality of gateway devices to the at least one person.

14. The method of claim 1, wherein the at least one edge device comprises at least one of:
the at least one camera, and
the at least one gateway device.

15. A system comprising:
at least one edge device comprising at least one processor, wherein the at least one processor is in communication with a non-transitory computer readable medium having software instructions stored thereon, wherein, upon execution of the software instructions, the at least one processor is configured to:
receive at least one image from at least one camera;
wherein the at least one camera is associated with at least one location within an area;
wherein the at least one image is of the at least one location within the area;
utilize at least one object detection machine learning model to detect at least one object present in the at least one image;
utilize at least one object recognition machine learning model to determine the at least one object to be:
at least one hazardous event, and
at least one person;
identify at least one gateway device within the at least one image based at least in part on the at least one location;
determine at least one hazardous event pixel distance between the at least one gateway device and the at least one hazardous event the at least one image;
determine at least one hazardous event physical distance indicative of a distance between the at least one gateway device and the at least one hazardous event in the area based at least in part on a predetermined measurement table;
wherein the predetermined measurement table comprises a mapping indicative of pixel distance to physical distance;
determine at least one person pixel distance between the at least one gateway device and the at least one person based at least in part on the at least one image;
determine at least one person physical distance indicative of a distance between the at least one gateway device and the at least one person in the area based at least in part on the predetermined measurement table;
generating, by the least one processor, at least one event alert to the at least one gateway device;
wherein the at least one event alert comprises:
at least one hazardous event indicator indicating the at least one hazardous event,
the at least one hazardous event physical distance, and
the at least one person physical distance;
wherein the at least one event alert is configured to cause the at least one gateway device to:
communicate with at least one wireless communication module associated with at least one person to determine at least one person physical distance of the at least one person based at least in part on at least one wireless signal strength of the at least one wireless communication module;
identify the at least one wireless communication module as associated with the at least one person based on the at least one person physical distance and the at least one person physical distance; and
communicate the at least one event alert to the at least one wireless communication module of the at least one person.

16. The system of claim 15, wherein, upon execution of the software instructions, the at least one processor is further configured to:
analyze a set of images associated with the location, the set of images comprising content depicting areas within the location;
identify, based on the analysis, a known object, the known object corresponding to a real-world item at the location;
determine a pattern of identification of the known object within at least a portion of the set of images;
calibrate, based on the pattern of identification, the predetermined measurement table, wherein the mapping of the at least one person pixel distance to a physical distance is based on the calibration.

17. The system of claim 16, wherein the determination of the at least one person physical distance is based on the calibrated predetermined measurement table.

18. The system of claim 15, wherein the at least one hazardous event comprises at least one of:
at least one electrical hazard,
debris,
at least one spill, and
at least one fire.

19. The system of claim 15, wherein the at least one wireless communication module comprises a plurality of Bluetooth radios.

20. The system of claim 15, wherein the at least one wireless signal strengths comprises a plurality of received signal strength indicators (RSSI).

21. The system of claim 15, wherein the at least one event alert is configured to cause the at least one gateway device to:
communicate with the at least one wireless communication module associated with the at least one person;
identify that the at least one wireless communication module is one wireless communication module; and
communicate the at least one event alert to the one wireless communication module.

22. The system of claim 15, wherein the at least one event alert is configured to cause the at least one gateway device to:
communicate with the at least one wireless communication module associated with the at least one person;
identify that the at least one wireless communication module is a plurality of wireless communication modules;
determine a plurality of user physical distances based at least in part on a plurality of wireless signal strengths of the plurality of wireless communication modules;
identify at least one wireless communication module of the plurality of wireless communication modules associated with the at least one person based on the at least one person physical distance and the plurality of user physical distances; and
communicate the at least one event alert to the at least one wireless communication module of the at least one person.

23. The system of claim 15, wherein, upon execution of the software instructions, the at least one processor is further configured to:
determine at least one person-to-hazard physical distance based at least in part on the at least one person physical distance and the at least one hazard physical distance.

24. The system of claim 15, wherein the at least one wireless communication module comprises at least one wearable device worn by the at least one person.

25. The system of claim 15, wherein, upon execution of the software instructions, the at least one processor is further configured to:
   identify a plurality of gateway devices within the at least one image based at least in part on the at least one location;
   determine for each gateway device of the plurality of gateway devices, a pixel distance between each gateway device and the at least one person based at least in part on the at least one image; and
   identify the at least one gateway device based at least in part on a nearest proximity of the plurality of gateway devices to the at least one person.

26. The system of claim 15, wherein the at least one edge device comprises at least one of:
   the at least one camera, and
   the at least one gateway device.

* * * * *